Patented May 20, 1930

1,759,286

UNITED STATES PATENT OFFICE

PAUL CYRUS SMITH, OF WESTERN SPRINGS, ILLINOIS, ASSIGNOR TO SWIFT & COMPANY, OF CHICAGO, ILLINOIS, A CORPORATION OF ILLINOIS

METHOD OF PREPARING ANIMAL MEATS FOR THE MARKET

No Drawing.    Application filed December 31, 1928. Serial No. 329,661.

This invention is based upon the discovery that it is possible to provide an improved quality of meat, especially in regard to texture, color, tenderness and flavor, if preliminary to the chilling operation and before the tissue tensions or sets, muscular masses or separate muscles are removed from the carcass and promptly chilled. By the production in the packing house of the separate muscles and muscular masses, as subdivisions of the carcass as distinguished from cuts or portions of carcasses as marketed under the present practice, more economic marketing is possible by reason of size and varying texture and quality of the several muscles or muscular masses, and the resultant saving of inedible tissue and bones, which can be utilized in the packing house for the production of numerous by-products, such as fats, soap, glycerine, fertilizer and chemicals.

Under present practice the carcasses of sheep and cattle are marketed whole, in halves or quarters or cuts such as chucks, etc. Certain consumers demand the higher priced portions of meat, such as the porterhouse, sometimes almost to the exclusion of the cheaper portions of meat, such as the plate or the shoulder. With other consumers the situation is reversed. This condition frequently results in some of the retail butchers marketing certain cuts of beef at higher prices, and other cuts of meat at lower prices than would seem to be properly proportionate to the value of the carcass. Since fresh meat is a highly perishable product, it is important that it be sold promptly. By the practice of this invention the varying needs of consumers may be more exactly served. This, it is believed, will induce fairer prices of all edible portions of the animal with a minimum of waste.

In the standard practice of the present time, it is customary to chill the carcass as a whole or in halves, including the bone structure.

In carrying out the invention, customary methods of slaughtering, eviscerating, and hide removal, all rapidly performed, are followed. Succeeding operations differ from the standard practice in order to avoid, either before or during the chilling operation, the tensioning of muscular tissues, or the straining of the meat due to setting actions and the weight of the whole or large portions of the carcass under suspension with the skeletal muscles still attached to the skeletal structure. By means of the present invention, the muscles are detached from the bone structure of the carcass and removed from their relationship with each other, and the muscle is thus permitted to assume the position of greatest relaxation. The improved process includes the steps of dividing the muscles or muscular masses from one another and chilling the muscles while in relaxed condition. The products resulting from the improved process are more tender and of better flavor than the same products would be if chilled under tension or while subjected to the strains due to the weight of a carcass when suspended, or the forced displacement of the bone structure of the carcass, as occurs under standard practice at the present time.

In applicant's copending application for Patent No. 249,594, filed January 26, 1928, on process of preparing animal carcasses for market, there is described a method of avoiding the stretching and straining action, which takes place when carcasses or large portions thereof are suspended in a limp state and chilled while suspended. In that process, the chilling operation is performed with the carcass so placed that the muscles and bone structure thereof remain in a substantially relaxed condition.

My invention includes the step of separating the muscles and muscular masses from the carcass in order to further improve the resulting product, and attain the other objects hereinbefore mentioned. By this method the muscles or muscular masses are separately chilled in preparing the meat for market. Each muscle is substantially free from tension during the chilling. In marketing the meat, the muscles which are thus separated may be cut directly across the grain without any interference of bone structure. The presence of bone in ordinary cuts, prepared by the prevailing methods, prevents, and interferes with, the best use of the knife.

Benefits other than those hereinbefore mentioned, result from the use of this process, as for example, the shortening of the time required for chilling. Under the old methods, much more time is required for properly reducing the temperature particularly along the joints or bones in the rounds of large sides of beef. Rapidity in chilling is an important factor in avoiding the development of bacteria especially along the joints or bones and a resulting loss or reduction in quality of the product.

The sale and shipment of meat, without bones, under applicant's improved process, will result in better service to the consumer. The weight of retail cuts will thus represent the quantity of meat, and not meat and bone combined, as under the old methods.

I claim:

1. The method of preparing food carcasses for market, which consists in separating from the structure of the carcass while it still retains animal heat the principal skeletal muscular masses thereof, and subsequently chilling such separated muscular masses for the purpose of removing the animal heat.

2. The method of preparing food carcasses for market which consists in separating from the structure of the carcass while it still retains animal heat individual skeletal muscles thereof, and subsequently chilling such separated individual muscles for the purpose of removing the animal heat.

3. The industrial method of treating food carcasses which consists in separating the skeletal muscular masses from a carcass while still limp, thereupon disposing the muscular masses in a relaxed position and then chilling the same, while in such position, for the purpose of removing the animal heat.

4. The industrial method of treating food carcasses which consists in systematically separating the skeletal muscles from a carcass and from each other while still limp, thereupon disposing the said muscles in a relaxed position and then chilling the same, while in such position, for the purpose of removing the animal heat.

5. The industrial method of treating food carcasses which consists in systematically separating the several muscles from the carcass and from each other while still retaining animal heat, thereupon disposing the muscles in a relaxed position and then chilling the same, while in such position, for the purpose of removing the animal heat.

6. The industrial method of treating food carcasses which consists in systematically separating muscular masses from a carcass and from each other while still retaining animal heat, thereupon disposing the muscular masses in a relaxed position and then chilling the same, while in such position, for the purpose of removing the animal heat.

7. The industrial method of treating food carcasses which consists in first, while the carcass still retains animal heat, separating such muscles as have heretofore commonly been chilled and set in their natural attached relation to each other and thereafter chilling the muscles for the purpose of removing the animal heat.

8. The industrial method of treating food carcasses which consists in first, while the carcass still retains animal heat, separating therefrom muscular masses which have heretofore commonly been chilled and set in their natural attached relation to the skeletal structure of a carcass, and thereafter chilling such muscular masses for the purpose of removing the animal heat.

Signed at Chicago this 26th day of Dec., 1928.

PAUL CYRUS SMITH.